C. Von Bonhorst.
Dental Mouth Meter.
N° 90,705. Patented Jun. 1, 1869.

Witnesses.
N. B. Smith
Alex Mahon.

Inventor.
C. Von Bonnhorst,
by Atty A. M. Smith.

United States Patent Office.

C. VON BONHORST, OF LANCASTER, OHIO.

*Letters Patent No. 90,705, dated June 1, 1869; antedated May 15, 1869.*

IMPROVED DENTAL MOUTH-METER.

The Schedule referred to in these Letters Patent and making part of the same.

*To all whom it may concern:*

Be it known that I, Dr. C. VON BONHORST, of Lancaster, county of Fairfield, and State of Ohio, have invented certain new and useful Improvements in Dental Mouth-Meters; and I do hereby declare the following to be a full, clear, and exact description of the same, reference being had to the accompanying drawings, making a part of this specification, in which—

Figure 1:
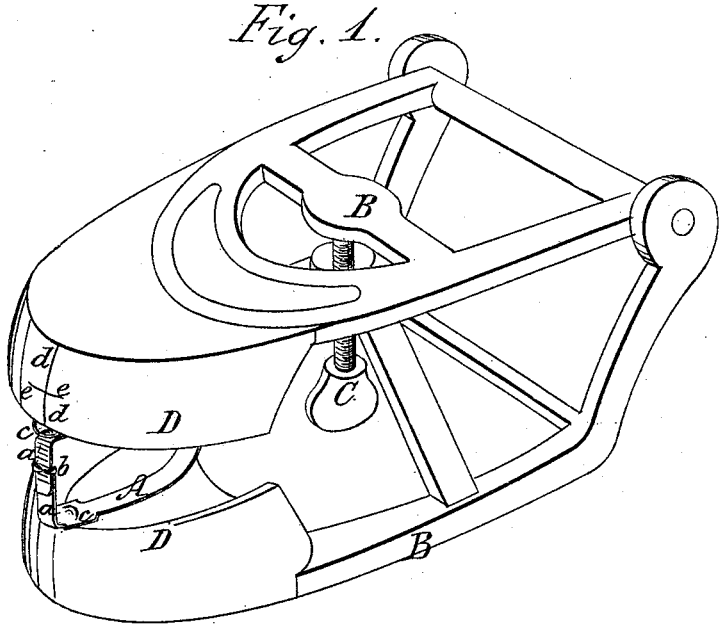
Figure 2:
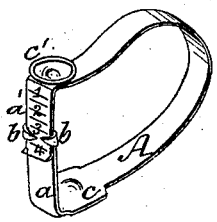

Figure 1 represents a perspective view of an articulator, with my improved meter applied thereto, for showing the manner of using said meter, and Figure 2 is a similar view of the meter.

Similar letters of reference denote corresponding parts in both figures.

The object of my invention is to facilitate the labor of the dentist in the process of inserting artificial teeth, by enabling him to determine, in the absence of the patient, the proper adjustment of the casts upon the articulator, and consequently the exact length of the teeth required therefor; and to this end, My invention consists in the construction an armanner of using a meter, adapted to be inserted in the mouth of the patient, for determining the distance between the alveolar ridges of the mouth, and the length of the upper lip when the mouth is in its natural position, in such manner as to enable the dentist to give the proper adjustment to the cast upon the articulator, and to regulate or determine, with the utmost exactness, the length of the teeth requisite therefor.

In the accompanying drawing—

A represents a light strip, or plate of spring-metal, or other suitable material, bent into U-form, and having its ends or arms turned or bent inward, and overlapping each other, as shown in fig. 2.

One of these ends, $a$, is provided with a clasp or hook, $b$, which embraces the arm $a'$, serving to retain the two arms in proper relation to each other, and also, by being pointed, as an index upon the scale formed on the arm $a'$.

The lower end of arm $a'$ is slightly bent, or is provided with a rib or spur, to prevent its escape from the index-clasp $b$, and is provided on its face with a scale composed of any desired arrangement of horizontal lines properly numbered or lettered, to enable the dentist to note the point thereon indicated by index $b$.

The plate A is expanded at $c$, and made slightly concave on its under surface, to adapt it to rest on the alveolar ridge of the mouth. The upper arm of the plate may be made in the same way, and, by this construction, the whole device or meter may be readily made or stamped from a single strip of metal, and afterward bent into suitable form for insertion into the mouth, as shown in the drawings. If preferred, however, little concave plates, or socket-pieces, $c$, may be applied thereto.

B represents an articulator of any usual or desired construction;

C is a set-screw for adjusting the jaws of the articulator; and

D D represent the "casts" made and applied to the articulator in any usual or preferred manner.

$d$ represents the median line on the upper casts, and $e$ a line at right angles thereto, as a point to measure from in determining the length of the teeth.

The manner of operating or using the meter is as follows, viz:

Place the instrument in the mouth, with the scale and index outward, resting the expanded portions $c$ immediately on the alveolar ridges of the upper and lower jaws; then let the patient bring the jaws slowly together, until the dentist is satisfied with the position thereof; then note the figure opposite the index, which will be the distance the casts should be apart on the articulator, when ready for arranging the teeth.

While the instrument is yet in the mouth, note the length of the upper lip on the scale.

After the casts have been fastened to the articulator, place the meter between the casts in the same position it occupied in the mouth, (see fig. 1,) and adjust the set-screw in the articulator to retain the casts in this position; then draw a line, $e$, across the median line, at right angles thereto, on the upper cast, as a point to measure from, and with dividers measure from said point to the figure on the meter which indicated the length of the lip, and by this measurement determine the length of the upper teeth.

By the length of the upper teeth, thus regulated or determined, the length of the lower teeth is also determined.

I have described the meter made in one piece, but it will be evident that it may be composed of several pieces, consisting of scale and index-plates, clasp and index socket-pieces, and springs, of suitable form, connecting them; but the construction shown is believed to be best adapted to the purpose for which the meter is designed, as combining lightness, durability, simplicity, and economy in cost of manufacture.

Having now described my invention,

What I claim as new, and desire to secure by Letters Patent, is—

1. An adjustable, or spring mouth-meter, adapted to be used in the process of inserting artificial teeth, substantially as described.

1. The mouth-meter, combining the spring and index, made in one piece, substantially as described.

In testimony whereof, witness my hand, this 29th day of August, 1868.

DR. C. VON BONHORST.

Witnesses:
 H. H. DOUBLEDAY,
 ALEX. MAHON.